US009369350B2

(12) United States Patent
Li et al.

(10) Patent No.: US 9,369,350 B2
(45) Date of Patent: Jun. 14, 2016

(54) METHOD AND SYSTEM OF NETWORK TRANSFER ADAPTIVE OPTIMIZATION IN LARGE-SCALE PARALLEL COMPUTING SYSTEM

(71) Applicant: International Business Machines Corporation, Armonk, NY (US)

(72) Inventors: Yan Li, Beijing (CN); Hai Bo Lin, Beijing (CN); Yue Zhang, Beijing (CN); Kai Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 13/685,111

(22) Filed: Nov. 26, 2012

(65) Prior Publication Data
US 2013/0144973 A1 Jun. 6, 2013

(30) Foreign Application Priority Data

Dec. 1, 2011 (CN) .......................... 2011 1 0393703

(51) Int. Cl.
| G06F 15/16 | (2006.01) |
| H04L 12/24 | (2006.01) |
| G06F 11/30 | (2006.01) |
| H04L 12/761 | (2013.01) |
| G06F 11/34 | (2006.01) |

(52) U.S. Cl.
CPC ............ *H04L 41/26* (2013.01); *G06F 11/3006* (2013.01); *G06F 11/3017* (2013.01); *G06F 11/3065* (2013.01); *H04L 41/0896* (2013.01); *H04L 45/16* (2013.01); *G06F 11/3433* (2013.01)

(58) Field of Classification Search
USPC ......................................................... 709/217
See application file for complete search history.

(56) References Cited

U.S. PATENT DOCUMENTS 7,346,405 B2 * 3/2008 Yeh .................... G05B 23/0264
700/83
7,650,331 B1 1/2010 Dean et al.
(Continued)

FOREIGN PATENT DOCUMENTS

| CN | 1933452 | 3/2007 |
| CN | 101883039 | 11/2010 |
| WO | 2011120791 | 10/2011 |

OTHER PUBLICATIONS

Yu, M., et al., "Profiling Network Performance for Multi-Tier Data Center Applications," NSDI'11 Proceedings of the 8th USENIX Conference on Networked Systems Design and Implementation, pp. 5-5, USENIX Association Berkeley, CA, USA copyright 2011.

(Continued)

*Primary Examiner* — Kevin Bates
*Assistant Examiner* — S M Rahman
(74) *Attorney, Agent, or Firm* — Fleit Gibbons Gutman Bongini & Bianco PL; Jon A. Gibbons

(57) ABSTRACT

A method and system for performing network transfer adaptive optimization in a large-scale parallel computing system. The method of network transfer adaptive optimization includes forming a message to be transferred through the network based on obtained information related to a task executed by computing nodes, wherein the message includes identification information of the computing nodes to perform data transfer and corresponding sink nodes, and an amount of data the computing nodes to transfer to the corresponding sink nodes; transferring the message to a network layer; and forming a new data transfer pattern for data transfer between the computing nodes and the corresponding sink nodes in accordance with the received message.

19 Claims, 9 Drawing Sheets

(56) References Cited

U.S. PATENT DOCUMENTS

| | | | |
|---|---|---|---|
| 8,495,752 B2* | 7/2013 | Sasaki | G06F 21/10 455/407 |
| 8,769,106 B2* | 7/2014 | Sheehan | H04L 29/08846 700/11 |
| 2002/0004827 A1 | 1/2002 | Ciscon et al. | |
| 2005/0144224 A1* | 6/2005 | Togashi | H04L 12/2805 709/203 |
| 2007/0028001 A1 | 2/2007 | Phillips et al. | |
| 2010/0142529 A1 | 6/2010 | Huang et al. | |
| 2011/0113136 A1 | 5/2011 | Phaal | |
| 2011/0154341 A1 | 6/2011 | Pueyo et al. | |
| 2011/0161294 A1 | 6/2011 | Vengerov et al. | |
| 2012/0143950 A1* | 6/2012 | Xiang | 709/204 |

OTHER PUBLICATIONS

Mandal, A., et al., "Provisioning and Evaluating Multi-Domain Networked Clouds for Hadoop-Based Applications," Published in Proceeding CLOUDCOM '11 Proceedings of the 2011 IEEE Third International Conference on Cloud Computing Technology and Science, pp. 690-697, IEEE Computer Society, Washington DC copyright 2011, ISBN: 978-0-7695-4622-3.

Chowdhyury, M., et al., "Managing Data Transfers in Computer Clusters with Orchestra," Proceeding SIGCOMM '11 Proceedings of the ACM SIGCOMM 2011 Conference, pp. 98-109, ACM< New York, NY, USA, copyright 2011, ACM SIGCOMM Computer Communication Review—SIGCOMM '11 vol. 41, issue 4, Aug. 2011 pp. 98-109.

Zhang, Y., et al., "iMapReduce: A Distributed Computer Framework for Iterative Computation," IPDPSW '11 Proceedings of the 2011 IEEE International Symposium on Parallel and Distributed Processing Workshops and PhD Forum, pp. 1112-1121, IEEE Computer Society, Washington DC copyright 2011, ISBN: 978-0-7695-4577-6.

Al-Fares, M., et al., "Hedera: Dynamic Flow Scheduling for Data Center Networks," NSDI'10 Proceedings of the 7th USENIX Conference on Networked Systems Design and Implementation, pp. 19-19; USENIX Association Berkeley, CA copyright 2010.

Combined Search and Examination Report dated May 20, 2013 for Application No. GB1221370.8.

* cited by examiner

METHOD AND SYSTEM OF NETWORK TRANSFER ADAPTIVE OPTIMIZATION IN LARGE-SCALE PARALLEL COMPUTING SYSTEM

CROSS-REFERENCE TO RELATED APPLICATIONS

This application is based upon and claims priority from prior China Application No. 201110393703.1 filed on Dec. 1, 2011, the entire disclosure of which is hereby incorporated by reference herein.

FIELD OF THE INVENTION

The present invention relates generally to parallel computing technology, and more specifically to a method and system of network transfer adaptive optimization in a large-scale parallel computing system.

BACKGROUND OF THE INVENTION

Currently, the computer network has been more and more popularized, and the scale of the computer network is still increasingly expanded. There are tens of thousands of servers and memories in the current computer network. Most of computers in the computer network, which typically do not have large storage capacity and bandwidth, are however advantageous of their large number.

In order to execute large-scale tasks in such a computer network, such as computation of large data sets, a distributed parallel computing framework has already been proposed. A computing system using such a parallel computing framework typically comprises a master node, one or more computing nodes, and one or more sink nodes. The master node partitions a large-scale data computing task into multiple small-scale sub-tasks, determines the number of computing nodes and sink nodes for executing the task and their locations, etc., and designates for each sub-task computing nodes and sink nodes for completion of the sub-task. The computing nodes receive and execute the sub-tasks designated thereto and notify the master node of completion of execution of the sub-tasks. The computing nodes transfer intermediate data to the sink nodes designated by the master node thereto based on instructions of the master control mode. The sink nodes perform proper combination based on an intermediate results received from the corresponding computing nodes so as to obtain a computation result directed to the present task. The computing nodes and the sink nodes are logical nodes and can be located on the same or different physical network nodes.

A typical example of such a parallel computing framework is MapReduce which is a software framework released by Google® in 2004 to support distributed computing on large data sets (typically greater than 1 TB) on clusters of computers (related documents can be downloaded from http://hadoop.apache.org/mapreduce/). More and more applications are adopting MapReduce. The MapReduce framework also comprises a Master (i.e., master node), one or more Mappers (i.e., mapping nodes) serving as computing nodes, and one or more Reducers (i.e., reduction nodes) serving as sink nodes.

Throughput is a key factor in MapReduce runtime. Because of the MapReduce framework itself, it is necessary to transfer a large amount of data therein, and for example, the output of Mappers needs to be transferred to specified Reducer in the shuffle phase. Generally speaking, data transfer patterns vary with different applications. But even for the same application, different task scheduling may also lead to different data transfer patterns in the network.

As a result, for many applications, the transfer of an intermediate result through the entire network becomes a throughput bottleneck. One main reason is that the applications have no knowledge of network conditions and cannot control network behaviors, and thus the applications totally rely on the network itself to complete data transfer. Meanwhile, the network has no understanding of data transfer patterns of the applications. Since the network always adopts a fixed data transfer pattern while the data transmission patterns of the applications may change greatly, bandwidth waste and congestion problems are caused in the network transfer.

FIG. 1A shows a problem of the existing MapReduce which is that Reducers at appropriate locations cannot be selected due to the lack of network information in the parallel computing environment. In the MapReduce framework, since a master node on an application layer has no knowledge of relative positional relations between Mappers and Reducers, it cannot select for the Mappers the Reducers closest thereto. FIG. 1B shows another problem of the existing MapReduce that bandwidth waste is caused due to application-layer multicast in the parallel computing environment. A system using the MapReduce framework normally has a network-layer multicast requirement, that is, it is required to transfer the same data from a host to a group of host computers. At present, this requirement is realized by application-layer multicast. However, the application-layer multicast is realized by unicast of the same data on a network layer multiple times. This causes a significant network bandwidth waste, especially when the amount of data is huge. FIG. 1C shows another problem of the existing MapReduce that network congestion is caused without good multi-path support in the parallel computing environment. Since network data transfer of the same Mapper is based on a fixed strategy, there is the possibility that data from the same Mapper is transferred through the same path, resulting in congestion in this path.

Therefore, there is a need in the prior art for the technology that a data transfer pattern varies according to different applications in the parallel computing environment.

SUMMARY OF THE INVENTION

In order to resolve at least one of the aforementioned problems existing in the prior art, the disclosure of the present invention is proposed. An embodiment according to one aspect of the disclosure of the present invention provides a technical solution of controlling a data transfer pattern on a network layer directed to an application on an application layer based on related information of the application.

The inventor of the present invention notes that, various techniques that attempt to control behaviors of network equipment in a unified and centralized way by software programming are springing up unceasingly. A typical example of such techniques is a SDN (Software Defined Networking)/ OpenFlow framework. The OpenFlow framework is a technique that performs programming of a network as an apparatus such as a computer. The OpenFlow framework provides APIs on a concept layer for many aspects from a physical network to control elements and allows applications to configure or manipulate the network by means of software.

An OpenFlow Switch converts a message forwarding process that was originally fully controlled by a switch/router into a process that is commonly performed by the OpenFlow Switch and a control server (Controller), thereby realizing separation of data forwarding from routing control. The Controller can control a flow table in the OpenFlow switch by an interface operation specified in advance, thereby achieving the purpose of controlling data forwarding. The flow table consists of a plurality of flow table entries each being a forwarding rule. A forwarding destination port for a data packet entering the switch is obtained by inquiring about the flow table.

The OpenFlow/SDN has a potential capability to implement a light-weighted multicast group, which can be dynamically created and modified with very small overhead. The SDN/OpenFlow has a potential capability to guide an application-controlled network. The SDN/OpenFlow normalizes network behaviors through a well-defined forwarding instruction set. A powerful software controller has a global view and direct control for the switch. The SDN/OpenFlow provides programmable APIs for network administrators.

The inventor of the present invention further notes that, since the MapReduce framework is located on an application layer in an OSI protocol stack while the OpenFlow framework is located on a network layer in the OSI protocol stack, no interaction is made therebetween. MapReduce can acquire data transfer requirements of applications, but it cannot feed back the information to OpenFlow so that MapReduce cannot make any influence on the data transfer pattern of the network. Although OpenFlow can control routing of data, it cannot obtain related information of the applications and thus cannot adjust the routing according to the different applications to make network traffic/load optimized. In view of this, the inventor of the present invention proposes the present invention to solve at least one of the technical problems in the prior art.

The present invention proposes to set an application engine in the MapReduce framework and set a network engine in the OpenFlow framework. The application engine can collect runtime information (such as information related to source and destination nodes of data transfer, amount of data, etc.) from data nodes. The application engine can also communicate with a master node to obtain related runtime information. Then the application engine translates said information into a message in a predefined format and transfers the message to the network engine. The network engine can obtain network information from a network controller. The network engine generates an optimal data transfer routing based on the received message and transfers it to the network controller so that the network controller implements the optimal data transfer routing.

The embodiments in the disclosure of the present invention can be carried out in a plurality of modes comprising methods or systems. Several embodiments in the disclosure of the present invention are discussed below.

As a method of network transfer adaptive optimization in a large-scale parallel computing system, an embodiment in the disclosure of the present invention at least comprises: forming a message to be transferred through the network based on obtained information related to a task executed by computing nodes, wherein the message includes identification information of the computing nodes to perform data transfer and corresponding sink nodes, and an amount of data said computing nodes to transfer to said corresponding sink nodes; transferring said message to a network layer; and forming a new data transfer pattern for data transfer between said computing nodes and said corresponding sink nodes in accordance with the received message.

As an apparatus of network transfer adaptive optimization in a large-scale parallel computing system, an embodiment in the disclosure of the present invention at least comprises: an application engine configured to form a message to be transferred through the network based on obtained information related to a task executed by computing nodes, wherein the message includes identification information of the computing nodes to perform data transfer and corresponding sink nodes, and an amount of data said computing nodes to transfer to said corresponding sink nodes; and a network engine configured to form a new data transfer pattern for the data transfer between said computing nodes and said corresponding sink nodes in accordance with the message received from the application engine.

BRIEF DESCRIPTION OF THE DRAWINGS

The drawings referenced in the present application are only used to exemplify typical embodiments of the present invention and should not be considered to be limiting the scope of the present invention.

DETAILED DESCRIPTION OF THE PREFERRED EMBODIMENT

In the following discussion, a great amount of concrete details are provided to help thoroughly understand the present invention. However, it is apparent to those of ordinary skill in the art that even though there are no such concrete details, the understanding of the present invention would not be influenced. In addition, it should be further appreciated that any specific terms used below are only for the convenience of description, and thus the present invention should not be limited to only use in any specific applications represented and/or implied by such terms.

In an embodiment in the disclosure of the present invention, an application engine on an application layer collects and transfers data transfer related information of a task to a network engine on a network layer, so that the network engine on the network layer performs adaptive optimization directed to network transfer, such as traffic and/or load, based on the received data transfer related information of the task and information related to routing and network conditions obtained by the network engine from a network controller, thereby determining an optimal routing for the data transfer of the task. After determining the optimal routing, the network engine on the network layer transfers the optimal routing to the network controller so that the network controller sets it to a network switch on the network layer to perform data transfer. Furthermore, the network engine can notify the application engine of locations of the sink nodes re-selected based on network information, and the application engine transfers the same to a master node. After that, the master node re-designates sink nodes for respective computing nodes according to the locations.

Figure 1A:
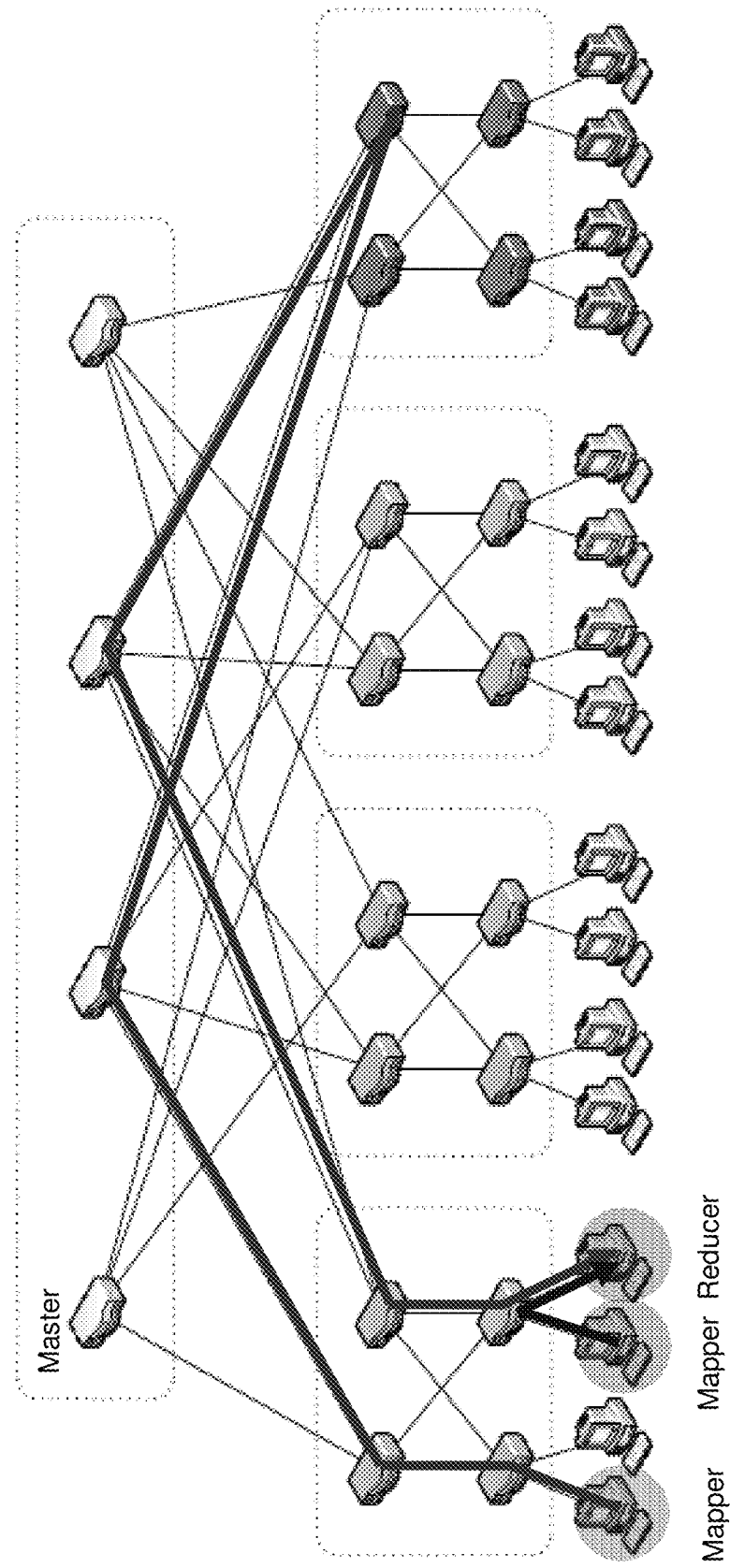
FIG. 1A is a schematic view showing a large-scale parallel computing environment according to the prior art in which sink nodes at appropriate locations cannot be selected due to the lack of network information.
Figure 1B:
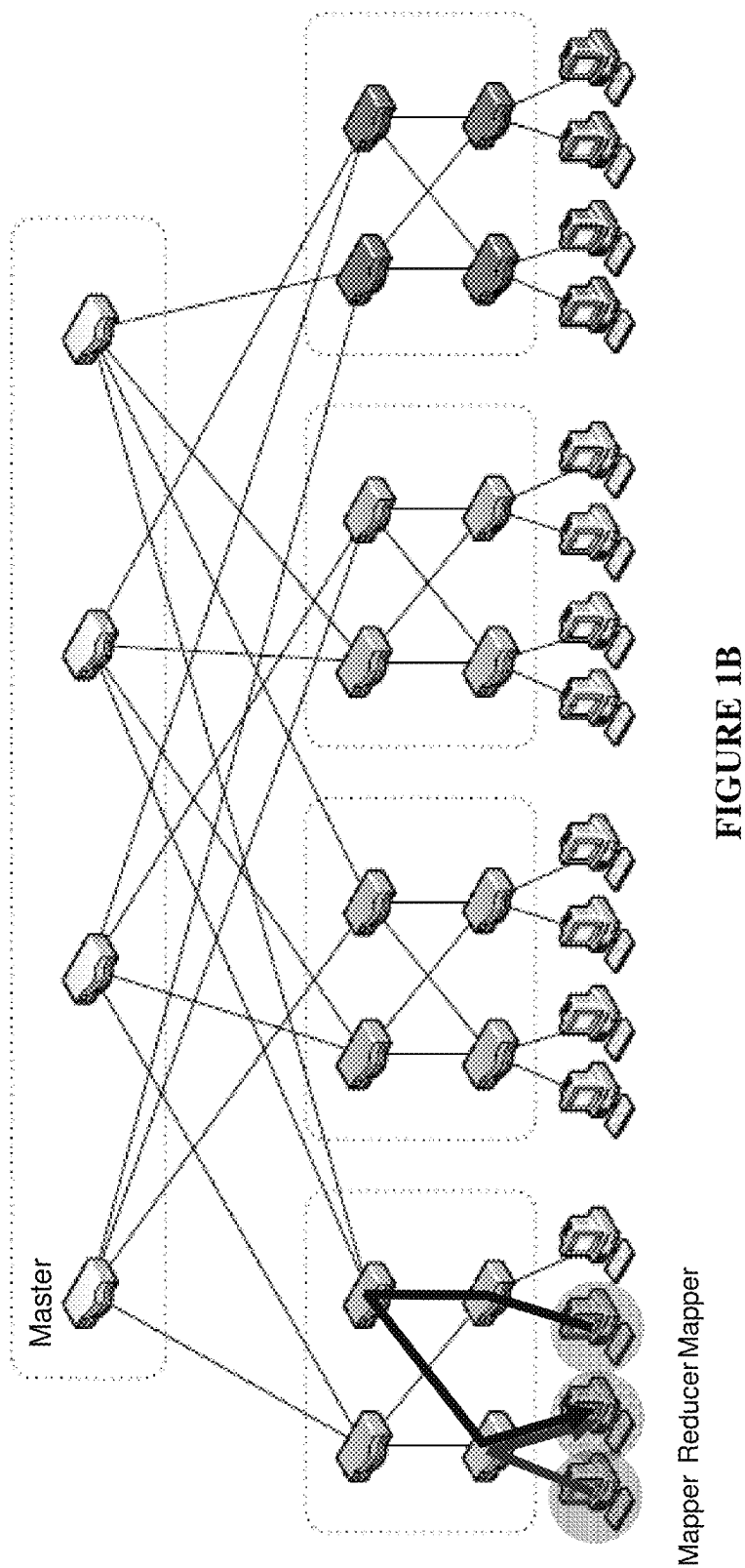
FIG. 1B is a schematic view showing a large-scale parallel computing environment according to the prior art in which bandwidth waste is caused due to application-layer multicast.
Figure 1C:
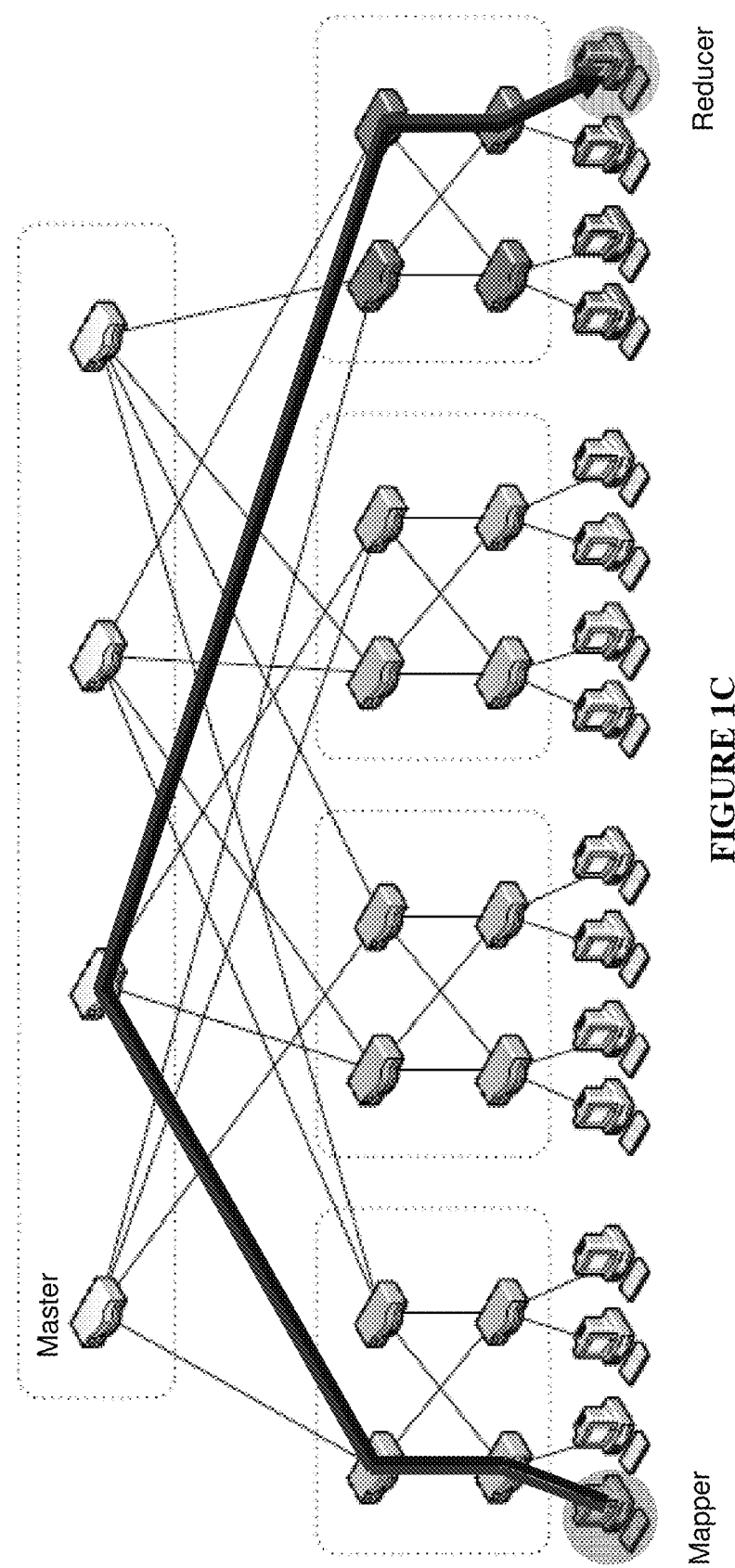
FIG. 1C is a schematic view showing a large-scale parallel computing environment according to the prior art in which network congestion is caused due to the lack of good multi-path support.
Figure 2:
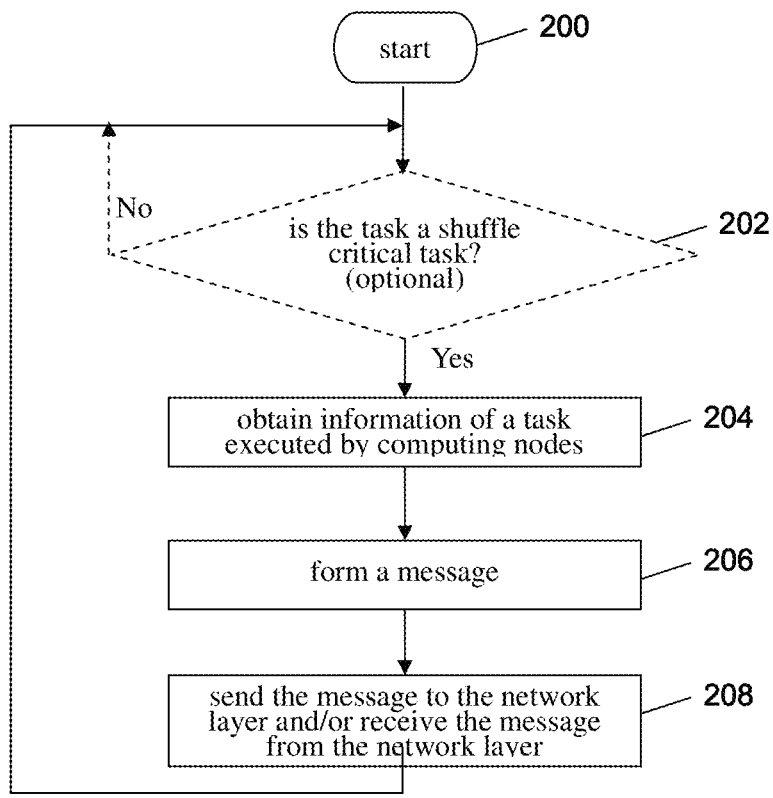
FIG. 2 is a schematic flow diagram showing a network transfer adaptive optimization process executed by an application engine on an application layer in a parallel computing system according to an embodiment in the disclosure of the present invention.

FIG. 2 shows a network transfer adaptive optimization processing flow executed by an application engine on an application layer in a parallel computing system according to an embodiment in the disclosure of the present invention.

At Step 200, the process starts.

At Step 202, it is judged whether a task executed by computing nodes is a shuffle critical task. If so, the process proceeds to Step 204. Otherwise, the process returns to step S202 to wait for the occurrence of the shuffle critical task.

Step 202 is optional. In a large variety of applications on an application layer, the applications that are sensitive to network transfer are generally called shuffle critical tasks. The performance of such applications is much or more influenced by the network transfer quality. Performing network traffic/load optimization directed to such applications will greatly improve the performance of the applications. For the applications that are insensitive to network transfer, performing network traffic/load optimization is meaningless. Out of consideration of optimization (for example, reducing the amount of data/network overhead, etc.), it is possible to perform the process directed only to the shuffle critical task.

At Step 204, information of the task executed by the computing nodes is obtained. Then the process proceeds to Step 206.

As described above, in the large-scale parallel computing system, a master node controls behaviors of computing nodes and sink nodes. Thus, the master node is capable of setting the computing nodes and the sink nodes to enable them to transfer their runtime information to the master node in real time, or periodically, or responsive to an instruction, or in other manners. The runtime information includes the generated amount of data, a proportion of a task portion having been executed to an overall task, and includes other information as required. The application engine can be implemented as having the said function of the master node, or obtains the runtime information from the master node.

At Step 206, a message to be transferred through the network is formed based on the received information related to the task executed by the computing nodes. The message includes identification information of the computing nodes that intend to perform data transfer and the corresponding sink nodes. The message can further include an amount of data said computing nodes intend to transfer to said corresponding sink nodes.

Preferably, the message is formed by being formatted. The message can have a predetermined format, which is any format that can be identified by both the application engine and the network engine. The message format according to an embodiment of the present invention is shown as below:
<total number of triplets>{<computing node ID, sink node ID, size of amount of data>, <computing node ID, sink node ID, size of amount of data>, . . . }
wherein the total number of triplets is the number of the triplets <computing node ID, sink node ID, size of amount of data> following it. The computing node ID and the sink node ID in the triplet are selected by the master node for each sub-task without consideration of network information and can be considered to be default in the present invention.

The size of amount of data is the amount of data that the computing nodes having the computing node ID in the same triplet intend to transfer to the sink nodes. This amount of data can be an amount of data generated when the computing nodes complete part or whole of the sub-task. When information of the amount of data is not received, the application engine can set the corresponding data stream size as NULL.

Preferably, said predetermined format can further have a task attribute field, which is shown as below:
<task attribute><total number of triplets>{<computing node ID, sink node ID, size of amount of data>, <computing node ID, sink node ID, size of amount of data>, . . . }
wherein the task attribute includes whether multicast is required by applications, namely, whether each computing node executing a sub-task is required to transfer its intermediate result to all sink nodes. This is determined in advance when the master node assigns a task. For example, if multicast is required, the task attribute can be set to "1", or otherwise set to "0".

Of course, the task attribute can further include other information as required, such as the degree of importance of a task. At this time, multiple bits can be used for the task attribute, such as 4 bits in which the first bit denotes whether to perform multicast and the remaining 3 bits denote the degree of importance. It is definitely possible to further use other manners a person skilled in the art can envisage, and these manners are embraced in the protection scope of the present invention.

Here, it needs to be noted that the order in which Step 204 and Step 206 are executed does not have to be the same as the order shown in FIG. 2 but can be reverse to the order shown in FIG. 2. For example, after the master node has assigned respective sub-tasks but before the computing nodes have not started to execute the corresponding sub-tasks, the application engine can send to the network engine a default message <1><4>{<N1, N10-13, NULL>, <N2, N10-13, NULL>, <N3, N10-13, NULL>, <N4, N10-13, NULL>}.

At Step 208, the message is sent to the network layer and/or received from the network layer.

The application engine can send, to the network engine, the generated message in a predefined format. Optionally, the message can be sent using HTTP. Optionally, the application engine can send the message after the sub-tasks have been assigned, or after the execution of any sub-task has been partially completed, or the execution of part of the sub-tasks has been completed, or after the execution of all the sub-tasks has been completed.

The application engine can also receive the message from the network engine. The message includes sink nodes re-selected by the network engine for a task and other information. The application engine or the master node can reset the sink nodes performing combining computation according to the received message and notifies it to the computing nodes.

After Step 208, respective steps shown in FIG. 2 are repeatedly executed.

Figure 3:
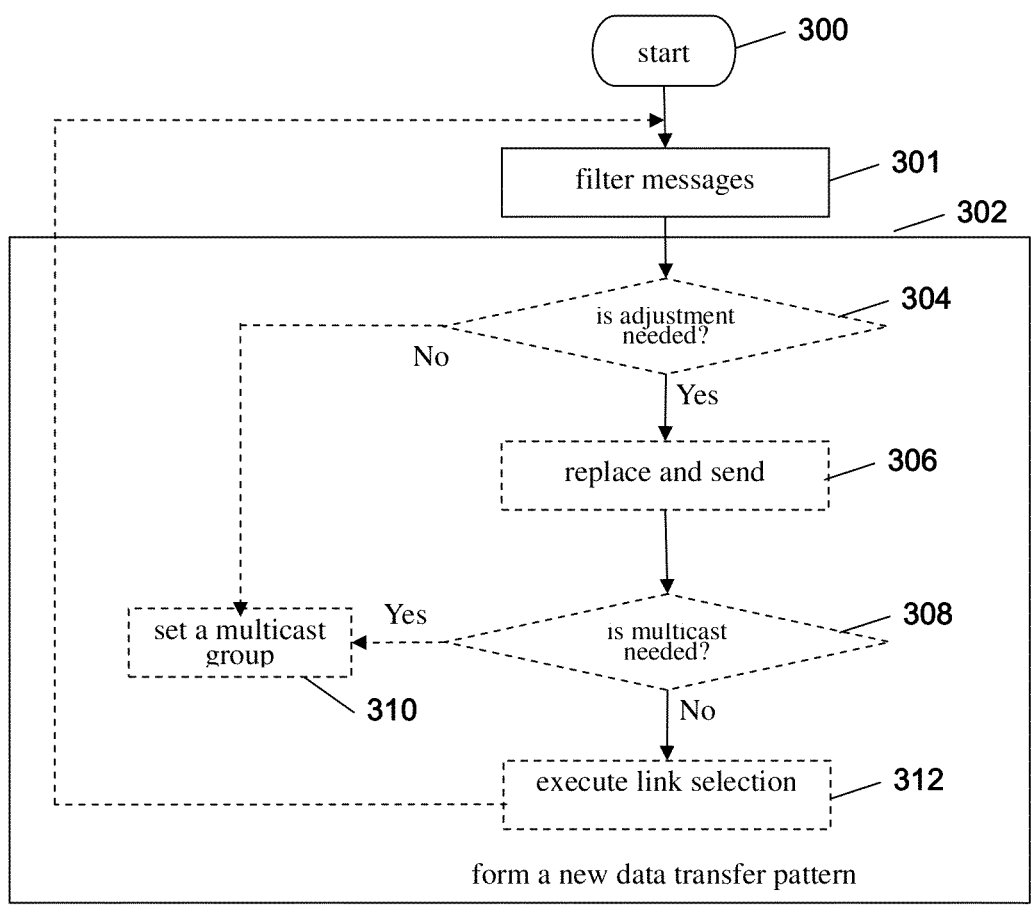
FIG. 3 is a schematic flow diagram showing a network transfer adaptive optimization process executed by a network engine on a network layer in a parallel computing system according to an embodiment in the disclosure of the present invention.

FIG. 3 shows a network transfer adaptive optimization processing flow executed by a network engine on a network layer in a parallel computing system according to an embodiment in the disclosure of the present invention.

At Step 300, the process starts.

At Step 301, the received message is filtered so that pairs of computing nodes and sink nodes that do not have high requirements for the network transfer performance are removed.

For example, the message received by the network engine is:

<0><3>{<N1, N3, 800 b>, <N2, N4, 8 Kb>, <N1, N3, 80 Kb>}.

Since the amount of data, 800 b, is a small load for the network and has a very low bandwidth requirement, the triplet <N1, N3, 800 b> is filtered out, so that the message becomes <0><2>{<N2, N4, 8 Kb>, <N1, N3, 80 Kb>}.

Step 301 is optional. Since a small amount of data does not have a high requirement for the network transfer performance, it is also possible not to discard it. It is preferred to discard these messages, thereby reducing the computation quantity at the network engine and improving the converging speed.

At Step 302, a new data transfer pattern is formed for data transfer between said computing nodes and said corresponding sink nodes according to the received message.

Step 302 can include Steps 304-312.

At Step 304, it is determined whether to adjust the locations of the sink nodes based on network information.

The network controller itself has a network topology structure and information of a physical distance between network nodes and a relative positional relation therebetween. The network engine can obtain the network information from the network controller. The network engine can calculate a sum of distances from all the possible locations of the sink nodes (i.e., the locations at which the sink nodes can be installed) to all the computing nodes. It is preferred to select a desired number of locations in turn from the location with the smallest distance as the locations where the sink nodes are installed, and the selected locations are compared with the default sink node locations (i.e., the sink node IDs included in the message), and if the two are different, it is determined to require adjustment. The distance depending on which the selection is made can be either a physical distance from a sink node to a computing node or the number of hops from the sink node to the computing node, and this can be selected by a person skilled in the art according to needs but is still embraced in the protection scope of the present invention.

Preferably, in order to improve the accuracy, it is possible not to use the simple calculation of the sum of distances, but to make determination using a weighted sum of the amounts of data. For example, the following formula can be used.

$$\text{Min}\left(\sum_{i}^{I} \text{amount of } data_{normalized,i} \times Distance_i\right)$$

where i is an index of computing nodes, and I, which is a positive integer, is the total number of computing nodes. The amount of $data_{normalized,i}$ is a normalized value of the amount of data from the $i^{th}$ computing node. Distance, is a distance between a sink node and the $i^{th}$ computing node.

Preferably, in order to reduce the search time for sink nodes, possible sink nodes are selected from among all the computing nodes. As aforementioned, a network node can be either a computing node or a sink node, so long as it has idle threads thereon.

Under this circumstance, it is preferred to calculate a distance to a computing node having idle threads thereon, and it is all right to select, from among these locations, sink nodes with the smallest distance. It is worth noting that, it is required to guarantee as much as possible the computing nodes to be close to the sink nodes, whereby a good result can be attained.

If the idle threads of all the computing nodes are not enough for the desire number of sink nodes, the nodes that are closest to any computing node (e.g., the neighbors with the shortest physical distance or the number of hops of which is 1) are found for calculation, and if these are still not enough, the range of the neighbors is gradually expanded.

At Step 306, the sink nodes in the message are replaced with the selected sink nodes, and the selected sink nodes are sent to the application engine. The application engine can replace the default sink node IDs with the received sink node IDs.

The replacement can be made to replace the default sink nodes from the selected sink nodes with the smallest distance according to an order of pairs of computing nodes and sink nodes in the message, and when the capacity of the selected sink nodes is reached, the replacement is made with the selected sink nodes with the secondarily smallest distance, and so on.

At Step 308, it is determined whether the task attribute in the message is set to multicast, and if so, the process proceeds to Step 310; otherwise, the process proceeds to Step 312.

At Step 310, a multicast group is created for each computing node.

The network-layer multicast is implemented by a network layer protocol such as IGMP. The IGMP (Internet Group Management Protocol) forms a group directed to multicast, and the IGMP maintains transfer of respective multicast nodes but is not responsible for routing. This is publicly known by those skilled in the art. That is to say, so long as the IGMP of the network layer is informed of performing multicast from each computing node to all the sink nodes, the network layer will create a multicast group from each computing node to all the sink nodes, creates a multicast tree among these nodes, and then makes a copy at a branch on the tree, whereby the network layer itself can realize multicast.

For a plurality of computing nodes, a plurality of multicast groups needs to be created. For example, if there are 10 computing nodes to 10 sink nodes, then 10 multicast groups will be required, each group being one of the computing nodes and all the sink nodes.

At Step 312, a network path for data transfer is re-selected based on information of network conditions.

First, the network engine uses the amount of data as a load to mark each link between the computing nodes and the sink nodes. For example, a message is <0><2>{<N2, N4, 8 Kb>, <N1, N3, 80 Kb>}. There are 4 links between N2 and N4, and for each link, its load value is marked with 8 Kb, while there are 2 links between N1 and N3, and for each sink, its load value is marked with 80 Kb.

Next, the network engine can set a weight value for a link based on the acquired information of the network conditions. The network engine knows the bandwidth of each network link and can acquire load conditions of each network link in real time. Still taking the above example, there are 2 links between N1 and N3, and the current load of Link 1 is 5% and its bandwidth is 8 Mb, and then its weighted load is 5%+80 Kb/8 Mb=6%; the current load of Link 2 is 10%, its bandwidth is also 8 Mb, and then its weighted load is 11%.

Finally, for each computing node to sink node transfer pair, the network engine selects the optimal path based on the load and/or the length of path.

It needs to be noted that, it is possible to realize selection of a shortest path using the existing protocols, such as OSPF, MOSPF (Multicast OSFP), DVMRP, PIM, etc., wherein the OSFP selects a shortest path for unicast, and MOSPF, DVMRP and PIM select a multicast tree for multicast.

After having selected the shortest path, a weight value of the path is updated using the weighted load. For unicast, all the passing sides are updated according to traffic, and for multicast, sides on the multicast tree are updated.

For unicast, it is required to calculate a load weight value for each path from one computing node to all the sink nodes, and then the load is updated or increased.

For multicast, a multicast tree from one computing node to all the sink nodes is first calculated, and then the updating is performed entirely (that is, a load weight value is calculated for sides on the multicast tree once, without necessity of repeating calculation).

Then, the network engine selects the path with a small load as the optimal path.

Optionally, it is possible to first group computing nodes at Step 312. In this case, the calculation of the shortest path and/or a weight value is executed directed to a root node in each group and the corresponding sink nodes, and the optimal path thus selected is set as a data transfer path for this group of computing nodes.

After Step 312, the process returns to Step 301, so as to execute the process shown in FIG. 3 directed to the next received message.

The network engine forms a routing rule for data transfer according to the optimal routing obtained at Step 312, and sets it to related switches in the network.

Although the respective steps are sequentially shown in the above figure, a person skilled in the art should understand that the steps shown can be executed in other orders, which are not limited to the order shown. For example, Step 308 and Step 312 can be executed in a reverse order.

Although the respective steps are shown in a serial order in the above figure, a person skilled in the art should understand that the steps shown can be executed in a parallel order. For example, Steps 304 and 306, Steps 308 and 310, and Step 312 can be executed concurrently.

Furthermore, a person skilled in the art can execute one or more of Steps 304 and 306, Steps 308 and 310, and Step 312 as required, thereby obtaining performance improvements in different aspects. For example, Steps 304 and 306 can select for computing nodes sink nodes at appropriate locations based on network information; Steps 308 and 310 support application-layer multicast using network-layer multicast; and Step 312 can perform link optimization with consideration of network information so as to balance the network link load.

Figure 4:
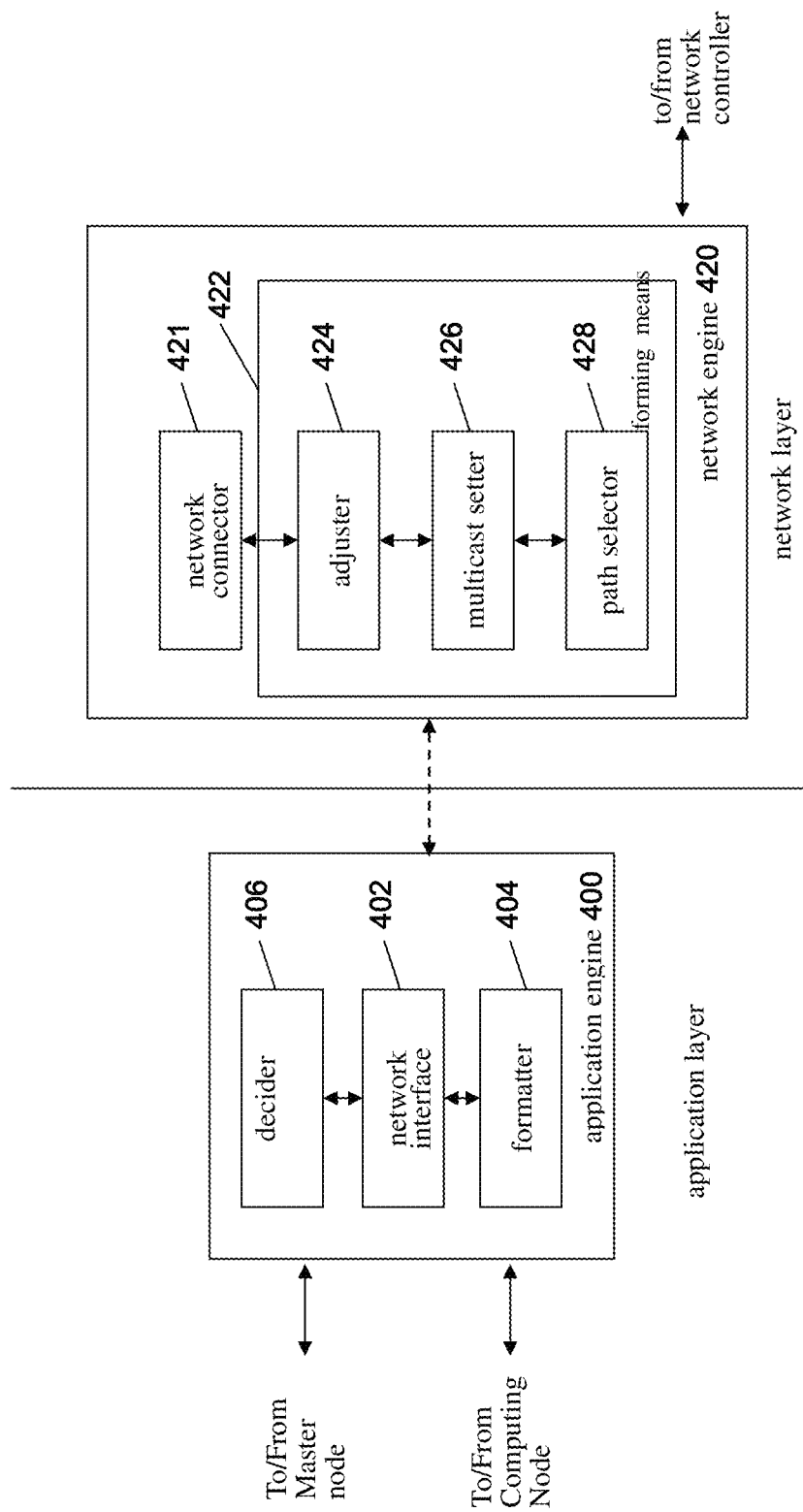
FIG. 4 is a schematic block diagram showing a parallel computing system capable of implementing a network transfer adaptive optimization process according to an embodiment in the disclosure of the present invention.

FIG. 4 shows a parallel computing system that is capable of implementing a network transfer adaptive optimization process according to an embodiment in the disclosure of the present invention.

As shown in FIG. 4, the computing parallel system according to the disclosure of the present invention comprises an application engine 400 on an application layer and a network engine 420 on a network layer.

The application engine 400 on the application layer includes a network interface 402 and a formatter 404 and an optional decider 406.

The network interface 402 communicates with the network engine on the network layer so as to deliver information between each other. In addition, the network interface 402 further communicates with a master node and computing nodes on the application layer. The network interface 402 receives information from the computing nodes and the master node, and transfers the information to the formatter 404, and receives setting information from the network engine 420 and transfers it to the master node.

The formatter 404 formats the information from the network interface 402 into a predefined format. Then the network interface 402 sends the formatted information from the formatter 404 to the network engine 420.

The decider 406 is used to decide whether a task is from a shuffle critical application. If so, information related thereto is received and sent using the network interface 402; otherwise, information of the task is ignored.

The network engine 420 on the network layer includes a network connector 421 and forming means 422. The forming means 422 includes one or more of an adjuster 424, a multicast setter 426 and a path selector 428.

The network connector 421 communicates with the application engine 400 on the application layer. Moreover, the network connector 421 further communicates with a network controller on the network layer (i.e., a SDN controller).

The forming means 422 forms a new data transfer pattern for data transfer between said computing nodes and said corresponding sink nodes based on the message received from the network connector 421.

The network connector 421 receives a message related to data transfer of applications from the application engine 400. The network connector 421 further receives information related to network conditions (including a network topology and bandwidth, load, etc.) from the network controller. The network connector 421 further sends the obtained optimal routing to the network controller for use to form a routing rule directed to the current applications. The network connector 421 further sends the obtained setting information related to the sink nodes to the application engine 400.

The adjuster 424 determines whether the default locations of the sink nodes set by the master node are appropriate based on the message received from the network connector 421. If it is determined that the default locations of the sink nodes are not appropriate, the locations of the sink nodes are re-selected. The adjuster 424 sends the re-selected locations of the sink nodes to the network connector 421 so as to notify the application engine 400 through it.

The multicast setter 426 determines whether multicast is required by the current application based on the received message. If it is determined that multicast is required, a multicast group is set directed to each computing node for the application.

The path selector 428 performs link optimization directed to unicast (i.e., the case in which multicast is not required) or a multicast group thereby to select an optimal path with consideration of path load and/or the shortest path.

Optionally, the network engine 420 can further include a message filter (not shown). The network connector 421, after receiving the message from the application engine 400, first sends it to the message filter. The message filter filters out pairs of computing nodes and sink nodes that do not have a high requirement for network transfer performance.

Optionally, the network engine 420 can further include a group divider (not shown). The group divider groups the computing nodes so that the path selector 428 selects the optimal path directed to a root node in each group and the corresponding sink nodes.

The specific implementation processes of the respective means in FIG. 4 are as described above with reference to FIGS. 2 and 3, the details of which are no longer made. Although FIG. 4 shows that the application engine 400 and the master node are separate from each other, and the network engine 420 and the network controller are separate from each other, a person skilled in the art should understand that the application engine 400 can be integrated with the master node, and the network engine 420 can be integrated with the network controller.

The basic idea of the present invention is described above, and a person skilled in the art should understand that the present invention adopts the increasingly popularized MapReduce framework while taking use of the advantage of the OpenFlow/SDN on network programming, so that the MapReduce framework on the application layer can interact with the OpenFlow/SDN controller on the network layer, thereby changing a data transfer pattern on the network layer according to different applications.

Figure 5A:
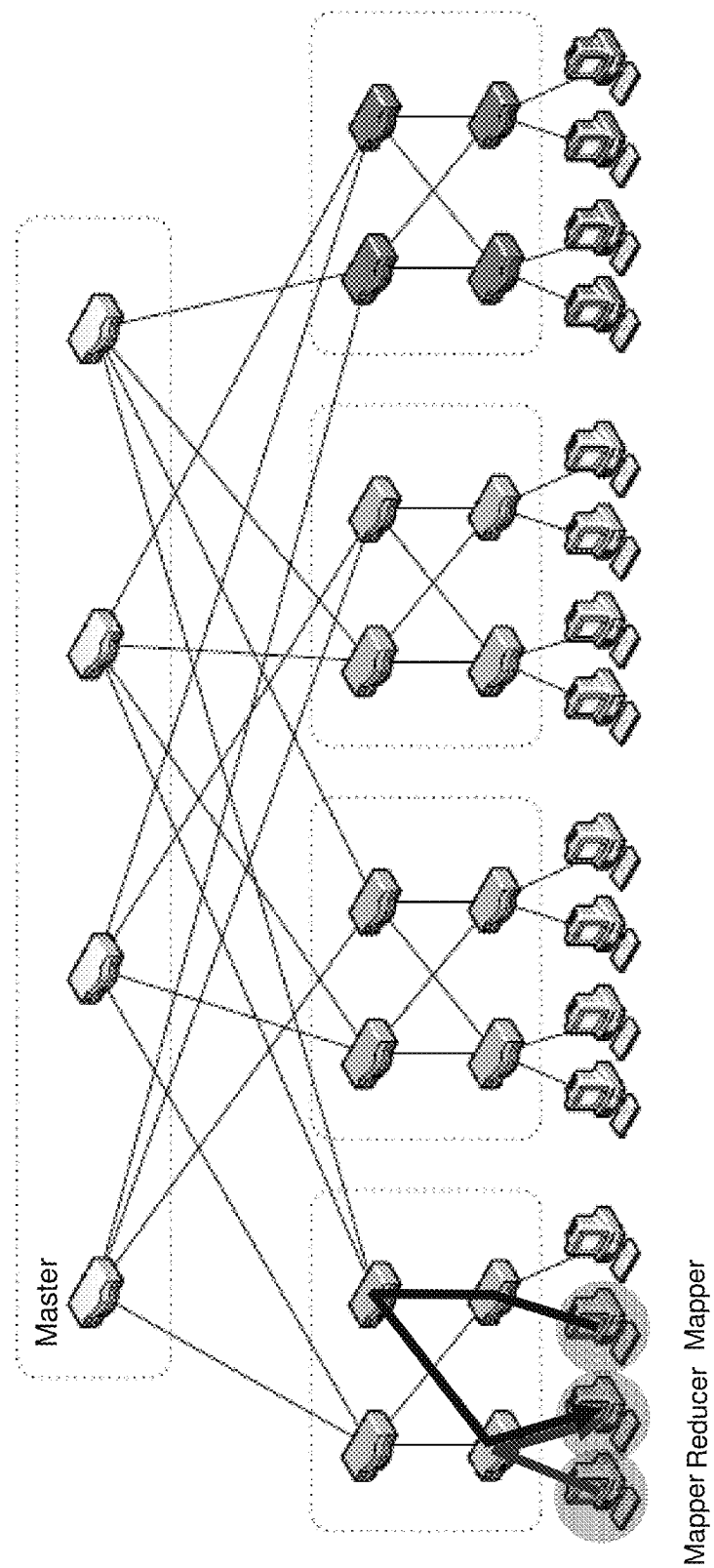
FIG. 5A is a schematic view showing a large-scale parallel computing environment according to an embodiment of the present invention in which sink nodes at appropriate locations are selected for having network information.

FIG. 5A shows a MapReduce parallel computing environment according to an embodiment of the present invention in which sink nodes at appropriate locations are selected for having network information. Since the network engine on the network layer knows a physical distance between network nodes and a relative positional relation therebetween, it is capable of selecting, for a Mapper, a Reducer with the shortest distance, thereby optimizing data transfer. This can be implemented by the processing processes at Steps 304 and 306 in FIG. 3.

Figure 5B:
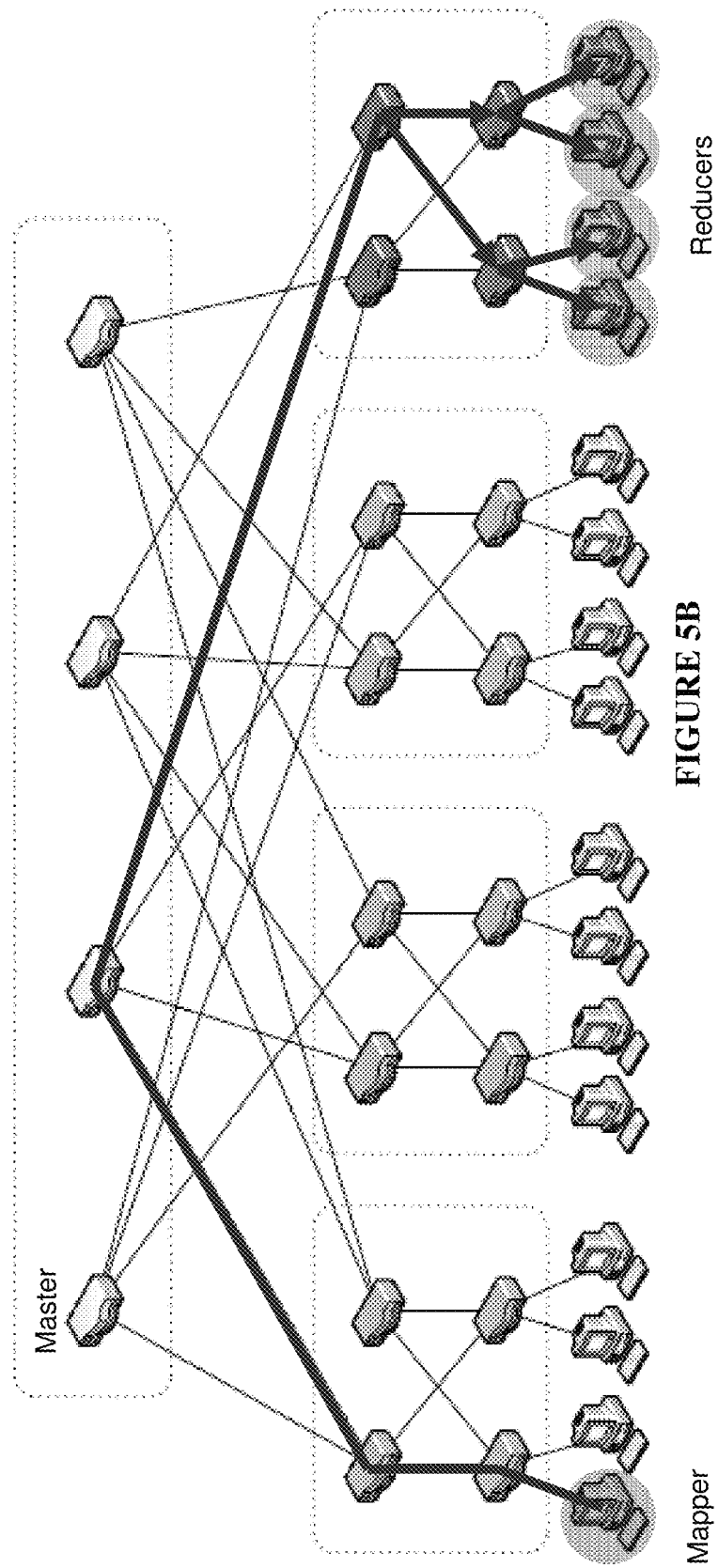
FIG. 5B is a schematic view showing a large-scale parallel computing environment after application-layer multicast is optimized using network-layer multicast according to an embodiment of the present invention.

FIG. 5B shows a MapReduce parallel computing environment after application-layer multicast is optimized using network-layer multicast according to an embodiment of the present invention. The present invention realizes multicast on the application layer by means of multicast on the network layer, thereby saving the transfer bandwidth. This can be implemented by the processing processes at Steps 308 and 310 in FIG. 3.

Figure 5C:
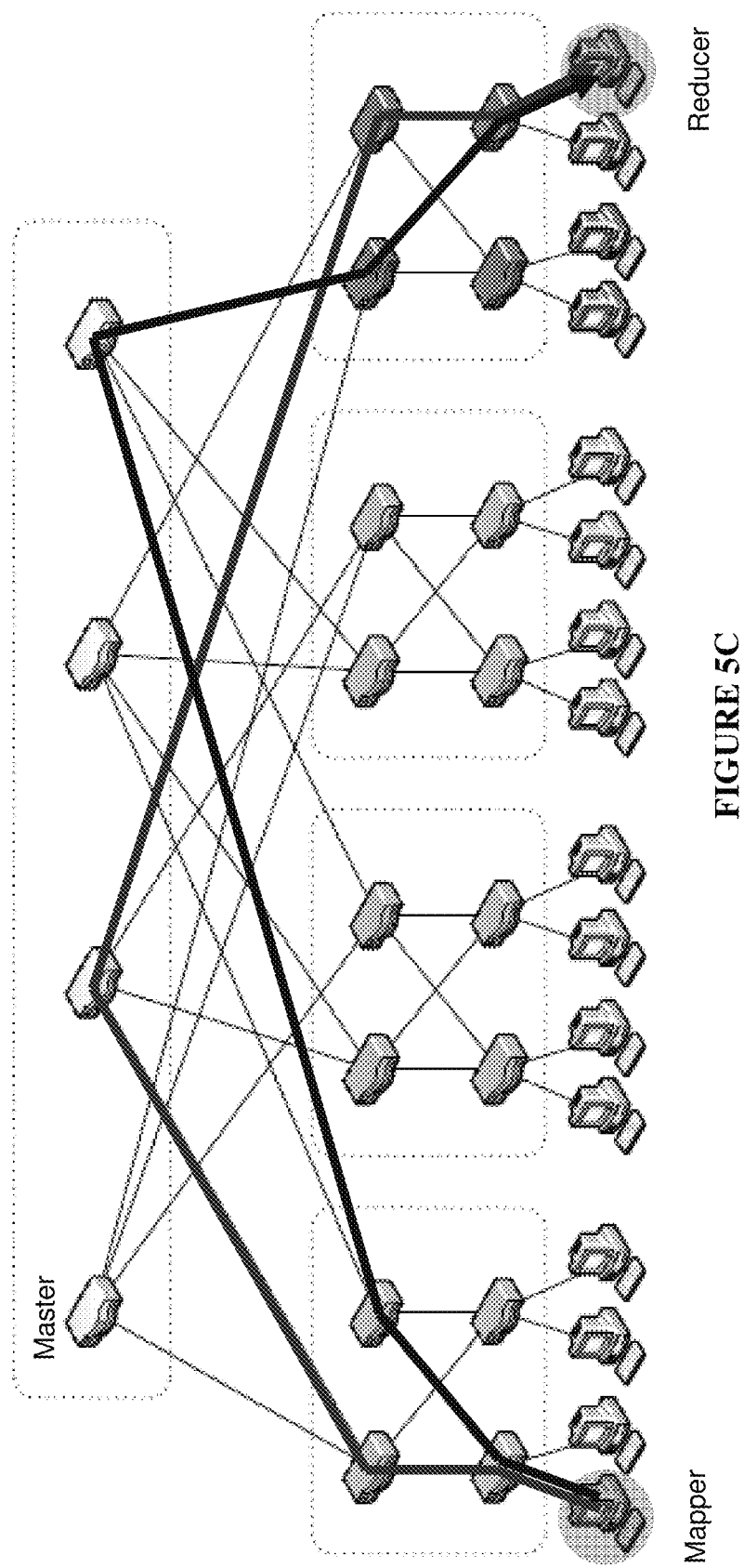
FIG. 5C is a schematic view showing a large-scale parallel computing environment that can have good multi-path support according to an embodiment of the present invention.

FIG. 5C shows a MapReduce parallel computing environment that can have good multi-path support according to an embodiment of the present invention. The present invention can distribute a load on a path onto multiple transfer paths according to the network load conditions, thereby avoiding network congestion. This can be implemented by the processing process at Step 312 in FIG. 3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system". Furthermore, aspects of the present invention may take the form of a computer program product embodied in any tangible medium of expression having computer usable program code embodied therein.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

The corresponding structures, materials, acts, and equivalents of all means or steps plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable those of ordinary skill in the art to understand the invention for various embodiments with various modifications as are suited to the particular use contemplated.

What is claimed is:

1. A method of network transfer adaptive optimization in a large-scale parallel computing system, comprising:
    forming a message to be transferred through the network based on obtained information related to a task executed by computing nodes, wherein the message includes identification information of the computing nodes to perform data transfer and corresponding sink nodes, and an amount of data said computing nodes to transfer to said corresponding sink nodes;
    transferring said message to a network layer; and
    forming a new data transfer pattern for data transfer between said computing nodes and said corresponding sink nodes in accordance with a received message,
    wherein said forming a message to be transferred through the network includes formatting the obtained information to form a message in a predetermined format, and
    wherein said predetermined format is:
    <total number of triplets>{one or more <computing node IDs, sink node IDs, size of amount of data>}, wherein the total number of triplets indicates the number of triplets <computing node ID, sink node ID, size of amount of data>in the message.

2. The method of network transfer adaptive optimization according to claim 1, wherein said forming a new data transfer pattern for data transfer between said computing nodes and said corresponding sink nodes includes:

determining whether locations of said sink nodes are needed to be adjusted in accordance with network information of the network layer and the received message; and if it is determined that the locations of said sink nodes are needed to be adjusted, replacing the sink nodes in said message with re-selected sink nodes.

3. The method of network transfer adaptive optimization according to claim 2, wherein said replacing the sink nodes in said message with the re-selected sink nodes includes:

replacing the sink nodes in said message in turn from a most preferred selected sink node, and when the amount of data of the replaced sink nodes reaches a capacity of the most preferred selected sink node, continuing to replace the sink nodes in said message with a secondarily preferred selected sink node.

4. The method of network transfer adaptive optimization according to claim 2, wherein said determining whether the locations of said sink nodes are needed to be adjusted includes:

calculating a sum of distances from each location at which a sink node may be located in said large-scale parallel computing system to each of all the computing nodes;

selecting a desired number of locations in turn from a possible location with a smallest distance as the locations of said sink nodes; and if the selected locations are different from the locations indicated by identification information of the sink nodes included in said message, determining that the adjustment is required.

5. The method of network transfer adaptive optimization according to claim 4, wherein said sum of distances is a weighted sum after weighting the distances using the amount of data.

6. The method of network transfer adaptive optimization according to claim 3, wherein said message further includes a task attribute of said task, said task attribute indicating whether multicast is required by said task, and wherein said method further comprises:

if said message indicates that multicast is required by said task, setting a multicast group, by a network engine, directed to each computing node and all the sink nodes.

7. The method of network transfer adaptive optimization according to claim 1, wherein said forming a new data transfer pattern for data transfer between said computing nodes and said corresponding sink nodes includes:

re-selecting a data transfer path between said computing nodes and said corresponding sink nodes in accordance with network information of said network layer and the received message.

8. The method of network transfer adaptive optimization according to claim 7, wherein said re-selecting a data transfer path between said computing nodes and said corresponding sink nodes includes:

marking each link between said computing nodes and said corresponding sink nodes in said message using said amount of data as a load;

calculating a weight value of the load for each link based on acquired network information; and selecting the data transfer path between said computing nodes and said corresponding sink nodes based on the weight value of the load.

9. The method of network transfer adaptive optimization according to claim 8, wherein the weight value of the load is calculated from a sum of a current link load indicated by the acquired network information and a ratio of the load and bandwidth as marked for the link.

10. The method of network transfer adaptive optimization according to claim 8, further comprising:

if said message indicates that multicast is required by said task, creating a multicast tree from each computing node indicated in said message to all the sink nodes; and for the multicast tree, executing re-selection of said data transfer path.

11. The method of network transfer adaptive optimization according to claim 8, wherein said selecting the data transfer path between said computing nodes and said corresponding sink nodes is further based on a shortest path between said computing nodes and said corresponding sink nodes.

12. The method of network transfer adaptive optimization according to claim 1, further comprising:

deciding whether said task is a shuffle critical task; and if said task is not the shuffle critical task, ignoring said task thereby to ignore information related to said task.

13. The method of network transfer adaptive optimization according to claim 1, wherein said forming a new data transfer pattern includes:

filtering the received message to remove the computing nodes with a smaller amount of data and the corresponding sink nodes from said message, and wherein said method of network transfer adaptive optimization further comprises:

feeding back information related to the formed new data transfer pattern to said computing nodes.

14. An apparatus of network transfer adaptive optimization in a large-scale parallel computing system, comprising:

an application engine configured to form a message to be transferred through a network based on obtained information related to a task executed by computing nodes, wherein the message includes identification information of the computing nodes to perform data transfer and corresponding sink nodes, and an amount of data said computing nodes to transfer to said corresponding sink nodes; and a network engine configured to form a new data transfer pattern for the data transfer between said computing nodes and said corresponding sink nodes in accordance with a message received from the application engine, wherein said application engine includes a network interface configured to receive said information; and a formatter configured to format the obtained said information to form a message in a predefined format, and wherein said predefined format is:

<total number of triplets>{one or more <computing node IDs, sink node IDs, size of amount of data>}, wherein the total number of triplets indicates the number of triplets <computing node ID, sink node ID, size of amount of data> in the message.

15. The apparatus of network transfer adaptive optimization according to claim 14, wherein said network engine includes:

an adjuster configured to determine whether locations of said sink nodes are needed to be adjusted in accordance with network information of a network layer of the network and in accordance with the message received, and if it is determined that the locations of said sink nodes are needed to be adjusted, replace the sink nodes in said message with re-selected sink nodes.

16. The apparatus of network transfer adaptive optimization according to claim 14, wherein said message further includes a task attribute of said task, said task attribute indicating whether multicast is required by said task, and wherein said network engine comprises:
  a multicast setter configured to, if said message indicates that multicast is required by said task, setting a multicast group, by a network engine, directed to each computing node and all the sink nodes.

17. The apparatus of network transfer adaptive optimization according to claim 14, wherein said network engine further includes:
  a path selector configured to re-select a data transfer path between said computing nodes and said corresponding sink nodes in accordance with network information of a network layer of the network and in accordance with the message received.

18. The apparatus of network transfer adaptive optimization according to claim 17, wherein said path selector further includes:
  group-divider configured to group said computing nodes so that said path selector selects the data transfer path directed to a root node in each group and said corresponding sink nodes.

19. A computer program product for network transfer adaptive optimization in a large-scale parallel computing system, the computer program product comprising:
  a non-transitory computer readable medium; and
  computer program instructions for
    forming a message to be transferred through the network based on obtained information related to a task executed by computing nodes, wherein the message includes identification information of the computing nodes to perform data transfer and corresponding sink nodes, and an amount of data said computing nodes to transfer to said corresponding sink nodes, and wherein said forming a message to be transferred through the network includes formatting the obtained information to form a message in a predetermined format,
  transferring said message to a network layer, and
  forming a new data transfer pattern for data transfer between said computing nodes and said corresponding sink nodes in accordance with the received message,
  wherein said predetermined format is:
  <total number of triplets>{ one or more <computing node IDs, sink node IDs, size of amount of data>}, wherein the total number of triplets indicates the number of triplets <computing node ID, sink node ID, size of amount of data>in the message.

* * * * *